(12) United States Patent
Young et al.

(10) Patent No.: US 8,881,911 B2
(45) Date of Patent: Nov. 11, 2014

(54) METHOD FOR IMPROVING FLOTATION CELL PERFORMANCE

(75) Inventors: Michael Francis Young, Brisbane (AU); Le Vi Huynh, Brisbane (AU); Brenton Burford, Wellington Point (AU)

(73) Assignee: Xstrata Technology Pty Ltd., Brisbane (AU)

( * ) Notice: Subject to any disclaimer, the term of this patent is extended or adjusted under 35 U.S.C. 154(b) by 231 days.

(21) Appl. No.: 12/733,783

(22) PCT Filed: Aug. 15, 2008

(86) PCT No.: PCT/AU2008/001189
§ 371 (c)(1),
(2), (4) Date: May 26, 2010

(87) PCT Pub. No.: WO2009/026612
PCT Pub. Date: Mar. 5, 2009

(65) Prior Publication Data
US 2011/0174696 A1    Jul. 21, 2011

(30) Foreign Application Priority Data
Aug. 28, 2007   (AU) ................................ 2007904649

(51) Int. Cl.
*B03B 5/62* (2006.01)
*B03D 1/24* (2006.01)
*B03D 1/02* (2006.01)
*B03D 1/08* (2006.01)
*B03D 1/14* (2006.01)
*B01D 21/26* (2006.01)

(52) U.S. Cl.
CPC .. *B03D 1/24* (2013.01); *B03D 1/02* (2013.01); *B03D 1/087* (2013.01); *B03D 1/1456* (2013.01); *B03D 1/1468* (2013.01); *B03D 1/1493* (2013.01); *B01D 21/26* (2013.01)
USPC ................................. 209/164; 209/18; 209/173

(58) Field of Classification Search
CPC ............ B03B 5/36; B03B 5/40; B03B 11/00; B03D 1/02; B03D 1/08; B03D 1/087; B03D 1/1406; B03D 1/1443; B03D 1/1468; B03D 1/1493
USPC ......... 209/18, 162–164, 168–170, 172.5, 173
See application file for complete search history.

(56) References Cited

U.S. PATENT DOCUMENTS 1,470,350 A * 10/1923  Court ........................... 209/170
3,098,818 A    7/1963   Daman et al.
(Continued)

FOREIGN PATENT DOCUMENTS

GB    536409 A    5/1941
GB    537401 A    6/1941
(Continued)

OTHER PUBLICATIONS

International Search Report: PCT/AU2008/001189 dated Oct. 21, 2008.

*Primary Examiner* — Joseph C Rodriguez
(74) *Attorney, Agent, or Firm* — Mintz Levin Cohn Ferris Glovsky and Popeo, P.C.

(57) ABSTRACT

A method of operating a flotation cell wherein a feed stream containing particles is provided to the flotation cell wherein a proportion of the particles rise in the cell and exit the cell in a concentrate stream and a proportion of the particles sink in the cell, wherein at least a portion of the particles that sink in the cell are subject to a classification process to produce classified particles and at least a portion of the classified particles are recycled to the flotation cell.

10 Claims, 5 Drawing Sheets

(56) References Cited

U.S. PATENT DOCUMENTS

| | | | |
|---|---|---|---|
| 3,928,182 A * | 12/1975 | Eder | 241/20 |
| 4,140,628 A * | 2/1979 | Horsfall | 209/39 |
| 4,545,892 A * | 10/1985 | Cymbalisty et al. | 208/391 |
| 4,588,559 A * | 5/1986 | Emmett | 422/162 |
| 4,617,113 A | 10/1986 | Christophersen et al. | |
| 4,938,865 A * | 7/1990 | Jameson | 209/168 |
| 4,960,509 A * | 10/1990 | McNeill | 209/164 |
| 5,332,100 A * | 7/1994 | Jameson | 209/164 |
| 5,431,286 A | 7/1995 | Xu et al. | |
| 5,672,267 A | 9/1997 | Terblanche | |
| 5,900,604 A * | 5/1999 | McNeill | 209/164 |
| 7,727,385 B2 * | 6/2010 | Siy et al. | 208/390 |
| 2010/0193408 A1 * | 8/2010 | Jameson | 209/164 |

FOREIGN PATENT DOCUMENTS

| | | |
|---|---|---|
| GB | 975655 A | 11/1964 |
| RU | 2133646 C1 | 7/1999 |
| RU | 2280510 C2 | 7/2006 |
| WO | WO-2008025088 A1 | 3/2008 |

* cited by examiner

METHOD FOR IMPROVING FLOTATION CELL PERFORMANCE

CROSS-REFERENCE TO RELATED APPLICATIONS

The present application claims priority to International Patent Application No. PCT/AU2008/001189, to Michael F. Young et al., filed Aug. 15, 2008, and entitled "METHOD FOR IMPROVING FLOTATION CELL PERFORMANCE", which claims priority to Australian Patent Application No. 2007904649 filed Aug. 28, 2007, the disclosures of which are incorporated herein by reference in their entireties.

FIELD OF THE INVENTION

The present invention relates to a method for improving the performance of flotation cells. In one aspect, the present invention relates to a method for improving the performance of Jameson cells.

BACKGROUND ART

Flotation cells have been used in mineral processing applications for over a hundred years. Mechanical cells (flotation cells that rely on an impeller to create agitation within the cell) have traditionally been the most common type of flotation cell. However, in more recent times, pneumatic flotation cells have become increasingly popular. One such type of pneumatic flotation cell is the Jameson cell, which has gained acceptance in a wide variety of applications, including base metals flotation, coal flotation, solvent extraction and waste water treatment.

The Jameson cell is a high-throughput flotation cell that significantly reduces the time required for conditioning of the feed material entering the cell. In traditional mechanical cells, a long conditioning time is needed to achieve the necessary contact between gas bubbles and reagentised particles in the feed stream in order that valuable mineral particles may be collected as a concentrate. By contrast, the Jameson cell uses a "downcomer" which acts as a plunging jet reactor to create a turbulent, high shear environment that provides excellent contact between bubbles and particles, significantly reducing the required conditioning time. Thus, the Jameson cell provides a number of benefits over mechanical cells, including higher throughputs, lower operating costs, less maintenance due to the presence of fewer moving parts and improved metallurgical performance. The Jameson cell is the subject of U.S. Pat. No. 4,938,865, and the disclosure of this document is hereby incorporated by reference.

The rise in popularity of the Jameson cell is due in large part to the improvements in flotation performance that can be obtained using this type of cell, coupled with a marked decrease in operating costs. In addition, due to the highly turbulent conditions created in the downcomer, there is much more efficient contact between gas bubbles, ore particles and reagents achieved in the Jameson cell than in conventional mechanical cells.

It has been found that recycling all, or part of, a flotation cell tailings stream to the feed inlet of the flotation cell may provide improved stability in the environment within the cell. In the past, however, the recycling of the tailings stream has been non-selective, which may result in small amounts of non-floating gangue material being recycled back into the cell, while, at the same time, it is possible that small amounts of the slow-floating valuable mineral will report to the tailings stream. Thus, there is considerable scope for the improvement of this process.

It will be clearly understood that, if a prior art publication is referred to herein, this reference does not constitute an admission that the publication forms part of the common general knowledge in the art in Australia or in any other country.

Throughout this specification, the term "comprising" and its grammatical equivalents shall be taken to have an inclusive meaning unless the context of use indicates otherwise.

OBJECT OF THE INVENTION

It is an object of the present invention to provide a method for improving the metallurgical performance of a Jameson cell which may overcome at least some of the abovementioned disadvantages, or provide a useful or commercial choice.

In a first aspect of the invention there is provided a method of operating a flotation cell wherein a feed stream containing particles is provided to the flotation cell, wherein a proportion of the particles rise in the cell and exit the cell in a concentrate stream and a proportion of the particles sink in the cell, wherein at least a portion of the particles that sink in the cell are subject to a classification process to produce classified particles and at least a portion of the classified particles are recycled to the flotation cell.

In one embodiment of the invention, the classification may produce at least a classified stream of low settling velocity particles, and wherein at least a portion of the classified stream of low settling velocity particles may be recycled to the flotation cell. In some embodiments of the invention, the classification may produce at least a classified stream of low settling velocity particles and a classified stream of high settling velocity particles. In some embodiments of the invention, the classification may further produce a classified middlings stream. Preferably, at least a portion of the low settling velocity particles may be fine particles.

In one embodiment of the present invention, the at least a portion of the classified stream returned to the flotation cell is combined with a fresh feed stream entering the flotation cell. Suitably, the streams may be combined in a sump, pumpbox, storage tank or the like.

In some embodiments of the invention, all of the particles that sink in the cell may undergo a classification process. In another embodiment of the invention, an entire tailings stream exiting the cell may undergo a classification process.

In a preferred embodiment of the present invention, the classification process may occur internally or externally to the flotation cell. Preferably, the classification of the tailings stream is based on mineral particle size, or mineral particle density. In a preferred embodiment of the present invention, the classification of mineral particles is based on the settling velocity of said particles within the flotation cell.

In embodiments of the invention in which the classification process is carried out internally to the cell, the classification may be carried out using any suitable method. However, in some embodiments of the invention, the low settling velocity particles may be selectively removed from the settling zone of the cell using an applied force. The removed low settling velocity particle stream may be transferred to any suitable vessel. It is preferred, however, that the low settling velocity particle stream may be transferred to a sump or pumpbox in fluid communication with the cell.

The applied force may comprise any suitable force, such as, but not limited to, suction. The applied force may be applied using any suitable technique. However, in a preferred embodiment of the invention the applied force is created using a pump. In some embodiments of the invention, a tube, conduit or the like may be inserted into the settling zone in the lower part of the cell and the applied force may be applied. In this way, low settling velocity particles may be forced into the tube or conduit and be deposited into a sump or pumpbox for recycling to the flotation cell.

The applied force may be applied using the head created from the slurry level in the cell, wherein low settling velocity particles may be removed from the cell using this applied force. Typically, the applied force may be applied in such a manner that high settling velocity particles may not be effected by the applied force.

In some embodiments the applied force may be a combination of suction force created by a pump, as well as the head created by the slurry level.

In another preferred embodiment of the present invention, the classification of mineral particles may be carried out by diverting at least a fraction of the tailings stream to a hydrocyclone.

In embodiments of the invention in which a hydrocyclone is used to classify the tailings stream of the flotation cell, the hydrocyclone may produce two or more products. The coarse underflow product may suitably be discarded as tailings or pumped to another part of the circuit for further processing, such as, but not limited to, flotation, gravity separation, dewatering, regrinding or any combination thereof, while the fine overflow stream may suitably be recycled to the flotation cell. If the hydrocyclone produces a middlings stream, the middlings stream may suitably be recycled to the flotation cell, discarded with the underflow stream or transferred to further processing in another part of the circuit, such as, but not limited to, flotation, gravity separation, dewatering, regrinding or any combination thereof.

In yet another preferred embodiment of the invention, a classification product consisting of fine, low-density particles is returned to the flotation cell as feed material.

The flotation cell may be of any suitable type. Preferably, however, the flotation cell of the present invention is a pneumatic flotation cell, such as those marketed under the names of G-Cell, Imhoflot, Pneuflot® as well as the Jameson cell. The recycled material may be suitably fed to the downcomer of the Jameson cell.

BRIEF DESCRIPTION OF THE DRAWINGS

An embodiment of the invention will be described with reference to the following drawings in which.

DETAILED DESCRIPTION OF THE DRAWINGS

It will be appreciated that the drawings have been provided for the purposes of illustrating preferred embodiments of the present invention. Thus, it will be understood that the present invention should not be considered to be limited to the embodiments shown in the attached drawings.

Figure 1:
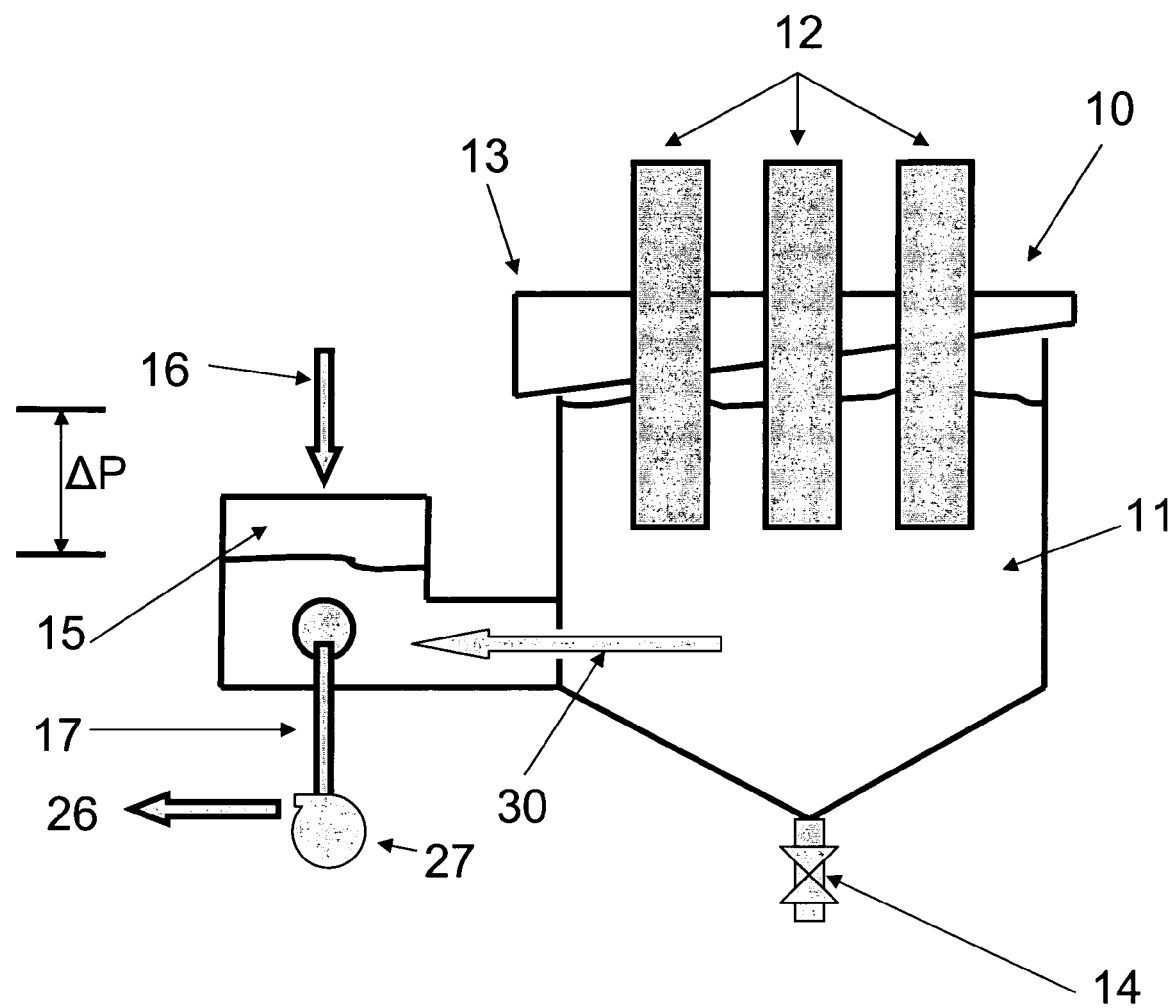
FIG. 1 illustrates a flotation cell low settling velocity particle recycle circuit according to one embodiment of the present invention.

In FIG. 1 there is illustrated a low settling velocity particle recycle circuit 10 according to one embodiment of the present invention. The low settling velocity particle recycle circuit 10 includes a Jameson flotation cell 11 comprising a number of downcomers 12 adapted to introduce slurry to the Jameson cell 11. The concentrate stream is collected in the concentrate launder 13, while the tailings stream exits the cell through a tailings valve 14. In prior art Jameson cells, all particles that do not report to the concentrate exit the cell 11 through the tailings valve 14. However, in the Jameson cell 11 illustrated in FIG. 1, the cell 11 is provided with an internal classification mechanism in which fast settling velocity particles only report to tailings and exit the cell 11 through the tailings valve 14. Low settling velocity particles 30, such as fine, slow-floating particles are diverted into a pumpbox 15 attached to the side of, and in fluid communication with, the Jameson cell 11.

The low settling velocity particles are diverted by creating suction within the Jameson cell 11 that draws the fine particles into the pumpbox 15. The suction is created using a pump 27. A fresh feed stream 16, may also be added to the pumpbox 15, and the combined stream 17 comprising the low settling velocity particle stream from the cell 11 and the fresh feed steam 16 may be pumped using pump 27 to the downcomers 12.

Alternatively, the pressure difference created by the difference in levels between the Jameson Cell 11 and the pumpbox 15, can create a force that diverts the slow settling velocity particles 30 into the pumpbox 15. However, the path of the particles with the higher settling velocity through the Jameson cell 11 will be unaffected due to their downward gravitational force and these particles will report to the bottom of the cell 11 and exit the cell 11 through valve 14.

Alternatively, a system using a combination of a pump creating suction, and pressure difference creating a head can also be operated.

The arrangement illustrated in FIG. 1 provides a number of significant advantages over the prior art. Firstly, having an internal classification system prior to the recycling stage means that only low settling velocity particles, such as slow-floating valuable mineral particles, will report to the recycling stage and fast settling velocity particles, such as coarse, non-floating gangue particles, will report to tailings. If recycling of the tailings stream took place without internal classification beforehand, all particles, including the fast settling velocity particles, such as non-floating gangue particles, would be recycled to the cell. If this were the case, a significant amount of energy would be used recycling fast settling velocity particles, such as non-floating particles, to the downcomers. In addition, recycling greater numbers of fast settling velocity particles to the downcomers reduces the volume of low settling velocity particles, such as slow-floating valuable mineral particles, or fresh feed, or a combination of both, which can be added to the recycled stream. Thus, with internal classification of the tailings stream, the cell throughput and metallurgical performance may be improved.

Figure 2:
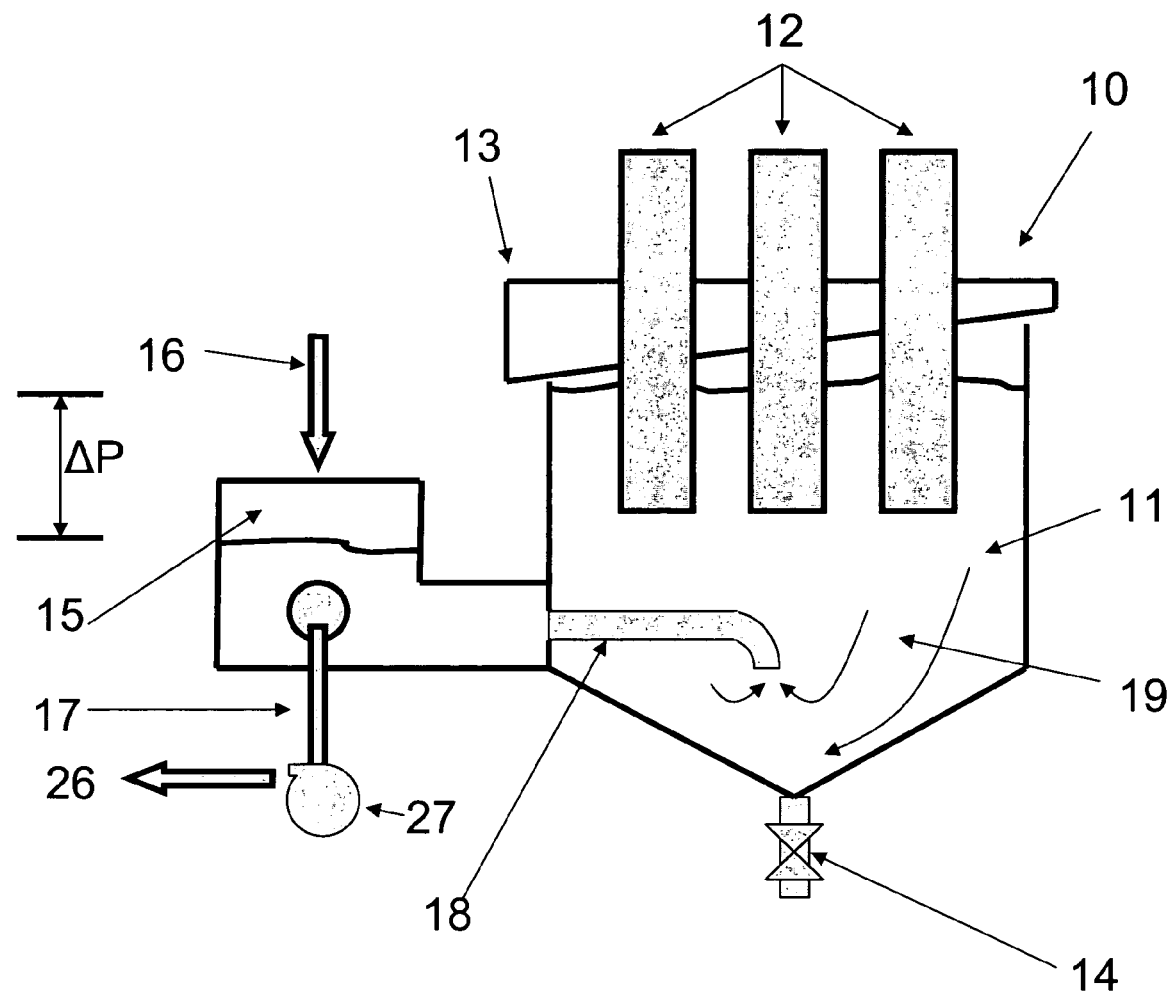
FIG. 2 illustrates a flotation cell low settling velocity particle recycle circuit according to one embodiment of the present invention.

Turning now to the embodiment of the invention illustrated in FIG. 2, there is shown a low settling velocity particle recycle system 10 including a Jameson cell 11 comprising a number of downcomers 12 adapted to introduce slurry into the Jameson cell 11. The Jameson cell 11 further comprises a concentrate launder 13 for removing concentrate from the cell 11. A tailings stream exits the cell 11 through a tailings valve 14.

A pumpbox 15 is connected to, and in fluid communication with, the cell 11. A pump 27 creates suction that draws low settling velocity, such as fine, slow-floating particles into the pumpbox through a tube 18 that projects into the settling zone 19 of the cell 11.

Alternatively, the pressure difference created by the difference in levels between the Jameson Cell 11 and the pumpbox 15 can create a force that diverts the slow settling velocity particles into the pumpbox 15. However, the path of the particles with the higher settling velocity through the Jameson cell 11 will be unaffected due to their downward gravitational force and these particles will report to the bottom of the cell 11 and exit the cell 11 through valve 14.

Alternatively, a system using a combination of a pump creating suction, and pressure difference creating a head can also be operated.

A fresh feed stream 16 is added to the pumpbox 15 and the combined stream 17 comprising the low settling velocity particles extracted from the cell 11 and the fresh feed stream 16 may be pumped using pump 27 to the downcomers 12.

Figure 3:
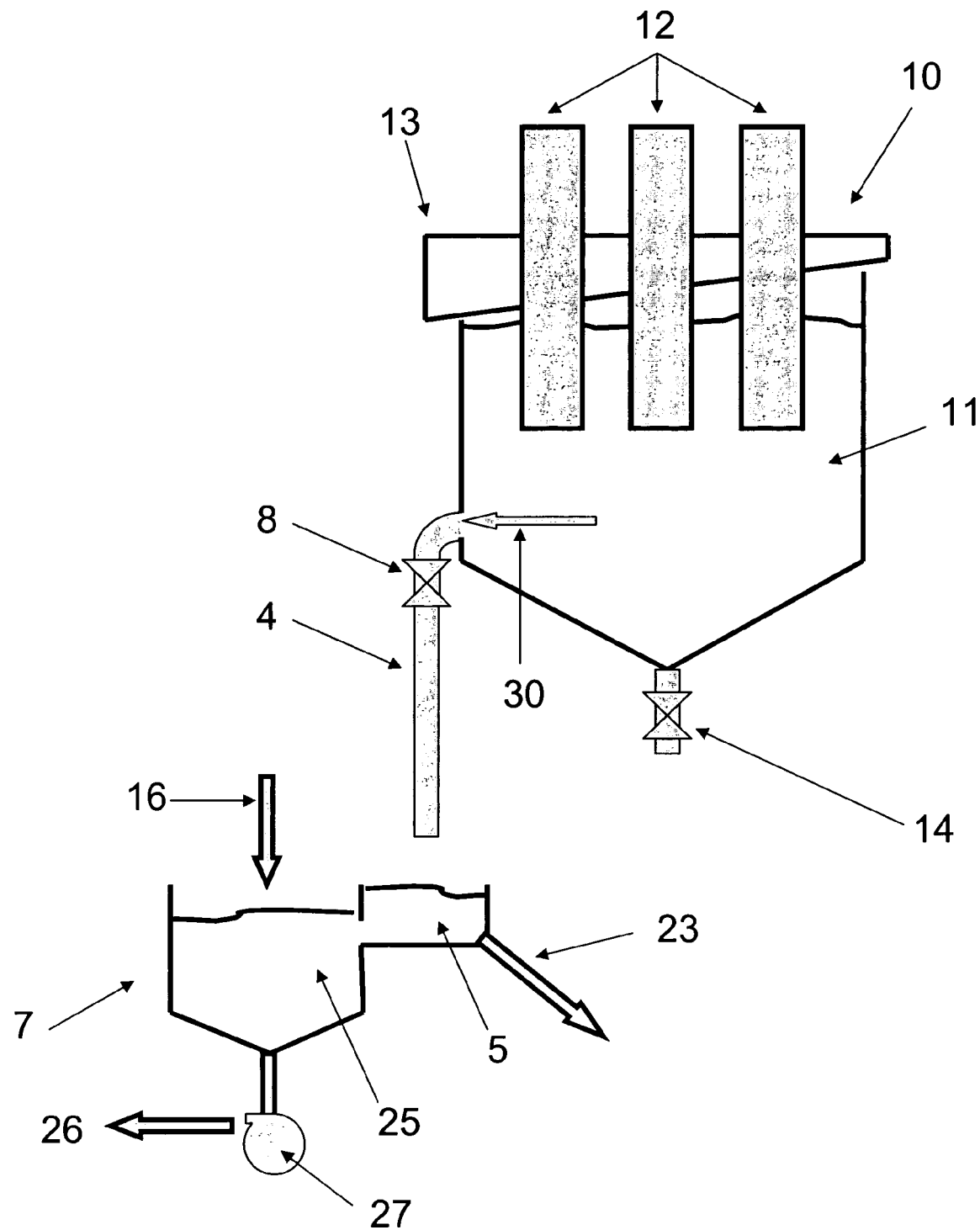
FIG. 3 illustrates a flotation cell low settling velocity particle recycle circuit according to one embodiment of the present invention.

An alternative embodiment of the invention is shown in FIG. 3. The low settling velocity particle recycle circuit 10 includes a Jameson flotation cell 11 comprising a number of downcomers 12 adapted to introduce slurry to the Jameson cell 11. The concentrate stream is collected in the concentrate launder 13, while the tailings stream exits the cell through a tailings valve 14. In prior art Jameson cells, all particles that do not report to the concentrate exit the cell 11 through the tailings valve 14. However, in the Jameson cell 11 illustrated in FIG. 3, the cell 11 is provided with an internal classification mechanism in which only fast settling velocity particles report to tailings, exiting the cell 11 through the tailings valve 14.

The slow settling velocity particles 30 are diverted by creating an applied force by the head created by the pulp level in the cell 11, which is strong enough to divert the slow settling velocity particles 30 through the outlet pipe 4 but not strong enough to alter the settling pattern of the fast settling velocity particles which are discharged from the cell 11 through tailings valve 14.

The slow settling velocity particles 30 leave the cell through pipe 4. In the embodiment of the invention illustrated in FIG. 3, the pipe 4 is provided with a valve 8, the valve 8 allowing the flowrate of slurry leaving the cell 11 to be adjusted.

Pipe 4 delivers the slow settling velocity particles 30 to a sump 5, connected to a pumpbox 25. A fresh feed stream 16 is added to the pumpbox 25. The sump 5 and pumpbox 25 are designed to ensure that the slurry level in the pumpbox 25 is constant, even with a fluctuating feed stream 16. A combined stream 26 comprising the fresh feed stream 16 and at least a portion of the stream 30 containing the slow settling velocity particles is transferred via a pump 27 to the downcomers 12 of the Jameson cell 11. In some embodiments of the invention, a portion 23 of the stream 30 containing the slow settling velocity particles may be discharge from the sump 5, where it may be combined with material discharging the cell 11 through tailings valve 14 for further processing, such as flotation, gravity separation, dewatering, regrinding or any combination thereof, or be sent to tailings. Alternatively, stream 23 can be transferred directly to another part of a flotation circuit for further processing such as flotation, gravity separation, dewatering, regrinding or any combination thereof, or be sent to tailings.

Figure 4:
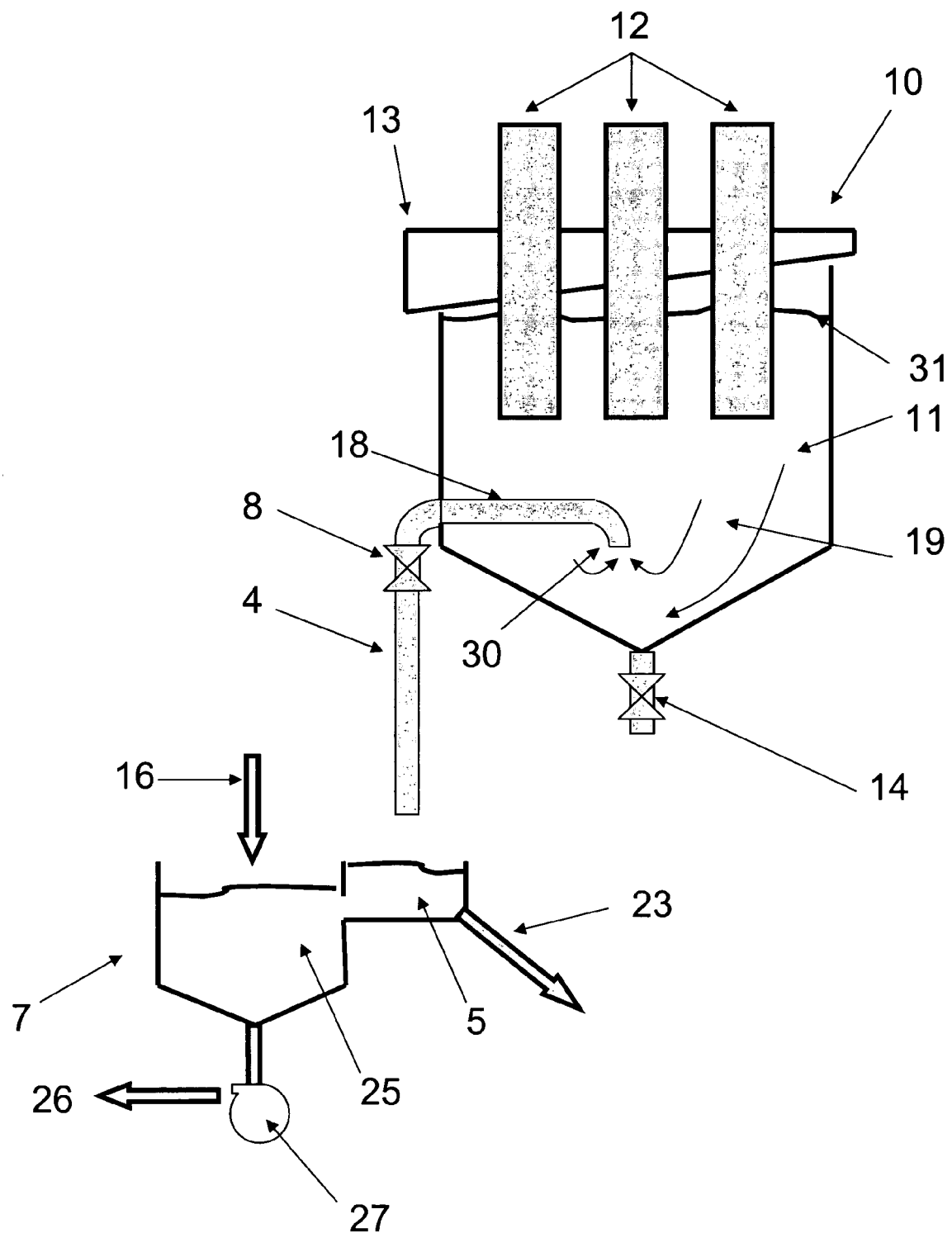
FIG. 4 illustrates a flotation cell low settling velocity particle recycle circuit according to one embodiment of the present invention.

A further embodiment of the present invention is shown in FIG. 4. The low settling velocity particle recycle circuit 10 includes a Jameson flotation cell 11 comprising a number of downcomers 12 adapted to introduce slurry to the Jameson cell 11. The concentrate stream is collected in the concentrate launder 13, while the tailings stream exits the cell 11 through a tailings valve 14. In prior art Jameson cells, all particles that do not report to the concentrate exit the cell 11 through the tailings valve 14. However, in the Jameson cell 11 illustrated in FIG. 4, the cell 11 is provided with an internal classification mechanism in which only the fast settling velocity particles report to tailings and exit the cell 11 through the tailings valve 14.

The slow settling velocity particles are extracted from the cell 11 by applying a force to the slow settling velocity particles. An applied force may be created by the head created by the pulp level 31 in the cell 11, the head being strong enough to divert the slow settling velocity particle into the entrance 30 of a pipe 18 extending into the cell 11. Slurry passing through the pipe 18 then passes into an outlet pipe 4. However, the head is not strong enough to alter the settling pattern of the fast settling velocity particles which discharge the cell 11 through tailings valve 14.

The slow settling velocity particles exit the cell through outlet pipe 4. In the embodiment of the invention illustrated in FIG. 4, the outlet pipe 4 is provided with a valve 8, the valve 8 adapted to allow the flowrate of slurry exiting the cell 11 through the outlet pipe 4 to be adjusted.

Outlet pipe 4 delivers the slow settling velocity particles to a sump 5, the sump 5 being connected to a pumpbox 25. A fresh feed stream 16 is added to the pumpbox 25. The sump 5 and pumpbox 25 are designed to ensure that the slurry level in the pumpbox 25 is constant, even with a fluctuating feed stream 16. A combined stream 26 comprising the fresh feed stream 16 and at least a portion of the stream containing the low settling velocity particles that discharges into sump 5, is transferred via a pump 27 to the downcomers 12 of the Jameson cell 11. In some embodiments of the invention, a portion 23 of the stream 30 containing the slow settling velocity particles may be discharge from the sump 5, where it may be combined with material discharging the cell 11 through tailings valve 14 for further processing, such as flotation, gravity separation, dewatering, regrinding or any combination thereof, or be sent to tailings. Alternatively, stream 23 can be transferred directly to another part of a flotation circuit for further processing such as flotation, gravity separation, dewatering, regrinding or any combination thereof, or be sent to tailings.

Figure 5:
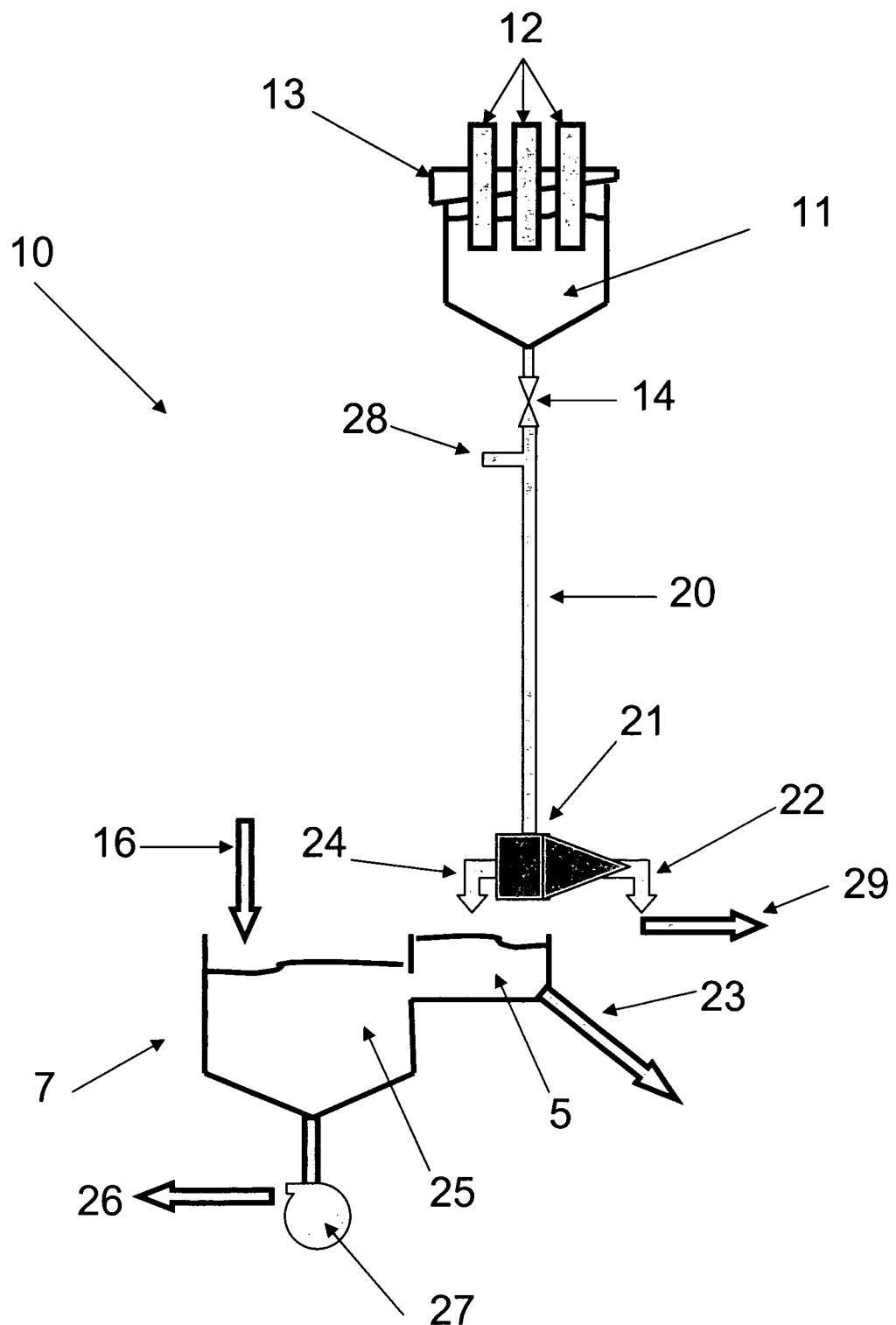
FIG. 5 illustrates a flotation cell low settling velocity particle recycle circuit according to one embodiment of the present invention.

An alternative embodiment of the invention is illustrated in FIG. 5. In the slow settling velocity particle recycling system 10 illustrated in FIG. 5, a Jameson cell 11 is provided with a number of downcomers 12 and a concentrate launder 13 for removing concentrate from the cell 11. The tailings stream 20 exits the cell 11 through a tailings valve 14 and is fed to a hydrocyclone 21. The hydrocyclone underflow stream 22, consisting of coarse, heavy particles, becomes the circuit tailings stream 29. This stream can be transferred to another part of the circuit for further processing, such as flotation, gravity separation, dewatering, regrinding or any combination thereof, or be sent to tailings. The hydrocyclone overflow stream 24, consisting of light, fine particles, is transferred to a sump 5, the sump 5 being connected to a pumpbox 25. A fresh feed stream 16 is added to the sump 25. The sump 5 and pumpbox 25 are designed to ensure that the slurry level in the pumpbox 25 is constant, even with a fluctuating feed stream 16 flowrate. A combined stream 26 comprising the fresh feed stream 16 and at least a portion of the cyclone overflow stream 24 is transferred via a pump 27 to the downcomers 12 of the Jameson cell 11. In some embodiments of the invention, a portion 23 of the hydrocyclone overflow stream 24 may be discharge from the sump 5, whereupon it may be combined with the hydrocyclone underflow stream 22 for further processing, such as flotation, gravity separation, dewatering, regrinding or any combination thereof, or be sent to tailings. Alternatively, stream 23 can be transferred directly to another part of a flotation circuit for further processing such as flotation, gravity separation, dewatering, regrinding or any combination thereof, or be sent to tailings.

Hydrocyclone operation can be assisted by the addition of water through addition point 28 to ensure the hydrocyclone 21 is operated at constant pressure if required.

Those skilled in the art will appreciate that the present invention may be susceptible to variations and modifications other than those specifically described. It will be understood that the present invention encompasses all such variations and modifications that fall within its spirit and scope.

The invention claimed is:

1. A method of operating a froth flotation cell comprising:
   providing a feed stream containing particles to the froth floatation cell, wherein a proportion of the particles rise in the cell and exit the cell in a concentrate stream and a proportion of the particles sink in the cell;
   classifying at least a portion of only the particles that sink in the cell on the basis of particle size to produce at least a classified stream of low settling velocity solid particles; and
   recycling at least a portion of the classified stream of low settling velocity solid particles to the froth flotation cell.

2. The method of claim 1, further comprising: combining the at least a portion of the classified particles returned to the flotation cell with a fresh feed stream entering the flotation cell.

3. The method according to claim 1, wherein the particles that rise in the flotation cell and exit the cell as a concentrate stream are subjected to a classification process.

4. The method according to claim 1, wherein classifying the particles that sink in the cell occurs internally to said flotation cell.

5. The method according to claim 1, wherein classifying the particles that sink in the cell occurs externally to said flotation cell.

6. The method according to claim 1 wherein classifying the particles that sink in the cell occurs in a hydrocyclone.

7. The method according to claim 1 wherein said flotation cell is a pneumatic cell.

8. The method according to claim 1 wherein said flotation cell is a Jameson cell.

9. The method according to claim 1, wherein the at least a portion of the classified stream of low settling velocity solid particles are recycled directly to the froth flotation cell.

10. A method of operating a froth flotation cell comprising:
    providing a feed stream containing particles to the froth floatation cell, wherein a proportion of the particles rise in the cell and exit the cell in a concentrate continuous flow and a proportion of the particles sink in the cell;
    classifying, internally within the froth flotation cell and on the basis of particle size, at least a portion of only the particles that sink in the cell to produce at least a classified continuous flow of low settling velocity solid particles; and
    recycling at least a portion of the internally classified continuous flow of low settling velocity solid particles directly to the froth flotation cell without further processing in another flotation circuit.

* * * * *